March 30, 1954

G. W. JOHNSON 2,673,515

APPARATUS FOR PRESERVING EGGS

Filed Oct. 20, 1948

INVENTOR,
Gordon W. Johnson.
BY
Roy E. Hamilton,
Attorney.

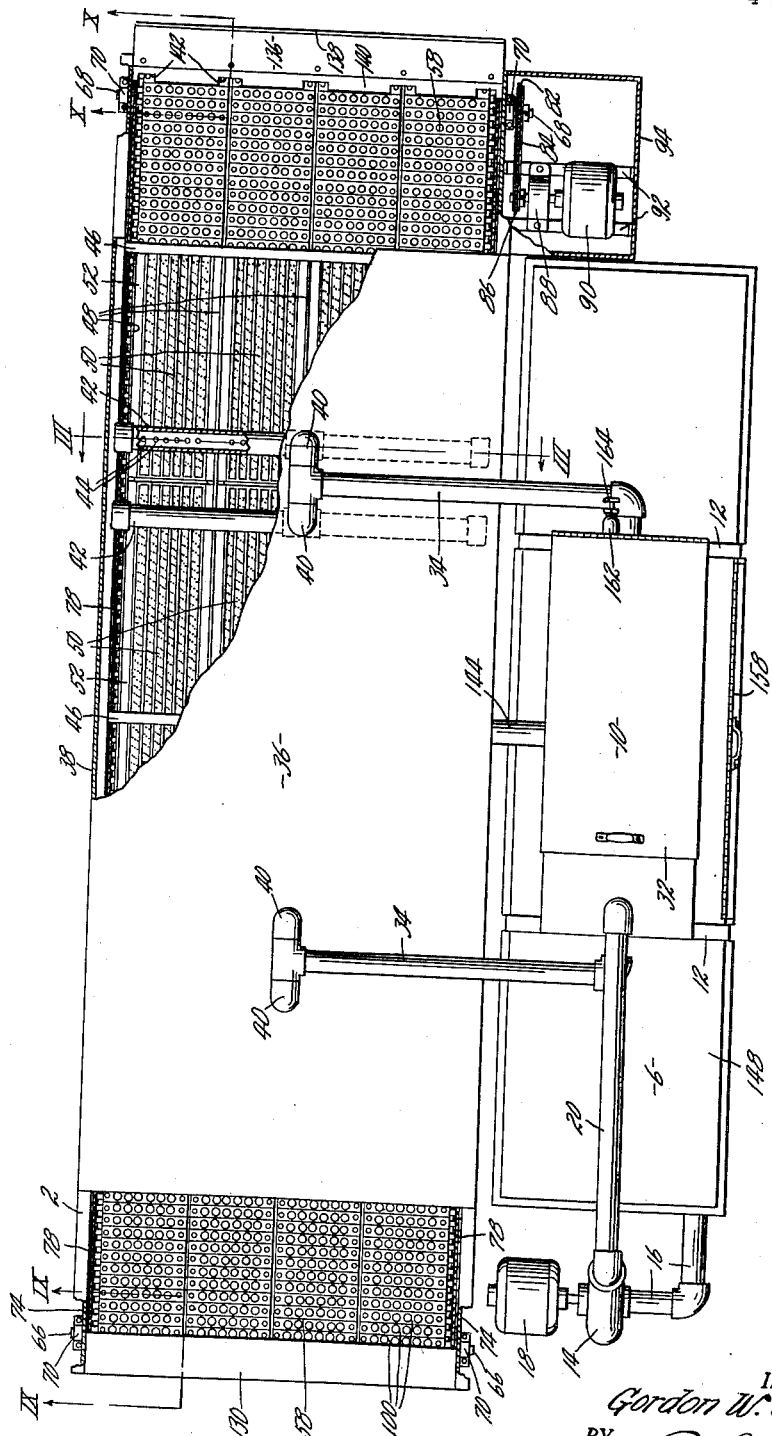

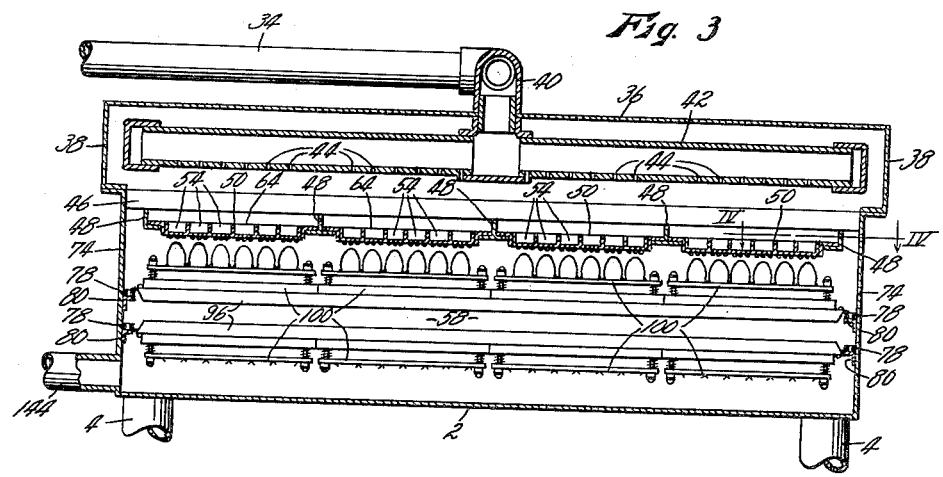
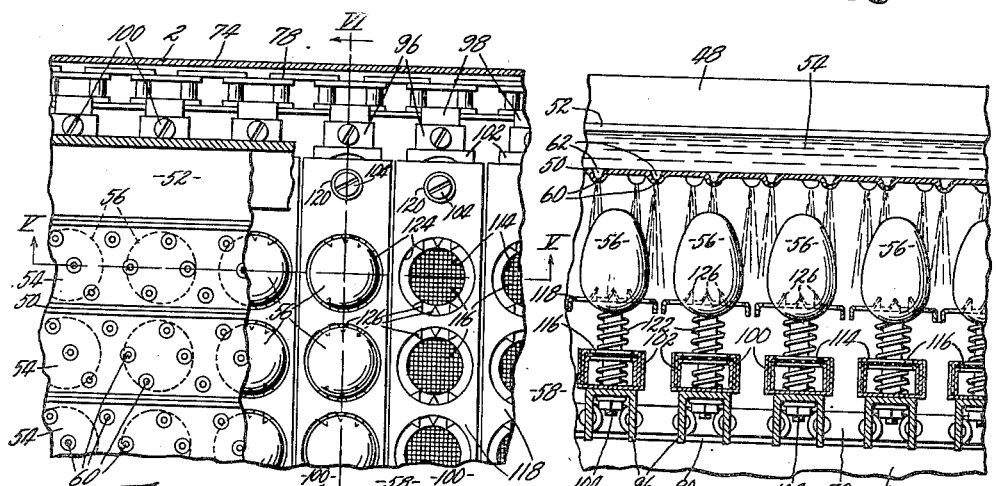
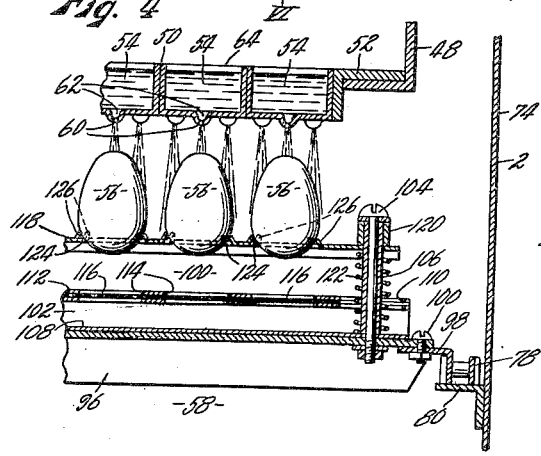

March 30, 1954

G. W. JOHNSON 2,673,515

APPARATUS FOR PRESERVING EGGS

Filed Oct. 20, 1948

INVENTOR,
Gordon W. Johnson.
BY
Roy E. Hamilton
Attorney.

Patented Mar. 30, 1954

2,673,515

UNITED STATES PATENT OFFICE 2,673,515

APPARATUS FOR PRESERVING EGGS

Gordon W. Johnson, Raytown, Mo., assignor to Gordon Johnson Company, Kansas City, Mo., a corporation of Missouri Application October 20, 1948, Serial No. 55,537

9 Claims. (Cl. 99—241)

This invention relates to improvements in apparatus for preserving eggs, and has particular reference to apparatus for carrying out the process commonly known as "thermo-stabilization" of eggs.

It is well known that eggs subjected to the action of a coating and sealing liquid such as a light mineral oil will keep satisfactorily under normal temperatures for much longer periods of time than will untreated eggs. This process seals the pores of the egg shell, thereby preventing evaporation of the egg moisture and preventing passage of contaminating air into the shell. It is also known that if the sealing liquid is heated and an egg is subjected thereto for a predetermined length of time, the keeping properties of the egg will be still further enhanced. The functions of the heat are not precisely understood in all aspects. One function, of course, is that as the egg is heated, air will be expelled therefrom by expansion, and when the egg is subsequently cooled in the presence of oil, the resultant partial vacuum formed within the egg will draw the oil into and through the pores of the shell, sealing the pores and coating the membrane inside of the shell. It is further believed that the application of heat accelerates or strengthens the natural germicidal function of the egg itself, thereby retarding or preventing the growth of undesirable bacteria therein. It is further believed that the slight thickening of the egg white caused by the heat further resists deterioration. This thickening must, of course, not amount to "cooking" the egg, and must not be accompanied by coagulation or "flecking" of the egg white. At present it has been found that subjecting each egg to continuously flowing streams of oil at about 125 deg. Fahr. for approximately fifteen minutes produces optimum results. However, it is to be understood that the apparatus forming the subject of this invention is not limited to any exact application of the process, but is adapted to vary the treatment temperature and time between wide limits as may be desired.

The principal object of the present invention is the provision of an apparatus whereby eggs may be subjected continuously to flowing streams of a sealing and coating liquid at a predetermined temperature, for a predetermined period of time.

Another object is the provision, in an egg preserving apparatus wherein eggs are subjected to flowing streams of a sealing and coating liquid, of egg supporting means whereby each egg is carried on pin-point supports, thereby permitting oil to flow over every part of the surface of the egg.

A further object is the provision, in an egg preserving apparatus wherein eggs are subjected to streams of a sealing and coating liquid and then permitted to drain, of means for removing the droplet of liquid which collects at the lowermost point of each egg, thereby preventing waste of the liquid and staining of the egg cartons and crates.

A still further object is the provision, in an egg preserving apparatus wherein eggs on a continuously moving conveyor are passed through flowing streams of a heated oil, of means for recirculating said oil, and means for separating moisture from said oil. Eggs removed from cold storage for preserving treatment will "sweat" and this condensate will be entrained in the oil and interfere with the proper action thereof unless removed.

With these objects in view, as well as other objects which will appear in the course of the specification, reference will be had to the drawing, wherein:

Fig. 2 is a plan view of the apparatus, with parts broken away.

Fig. 3 is an enlarged fragmentary view taken on line III—III of Fig. 2, with parts broken away.

Fig. 4 is an enlarged fragmentary section taken on line IV—IV of Fig. 3, with parts broken away.

Fig. 5 is a fragmentary section taken on line V—V of Fig. 4.

Fig. 6 is a fragmentary section taken on line VI—VI of Fig. 4.

Figure 1:
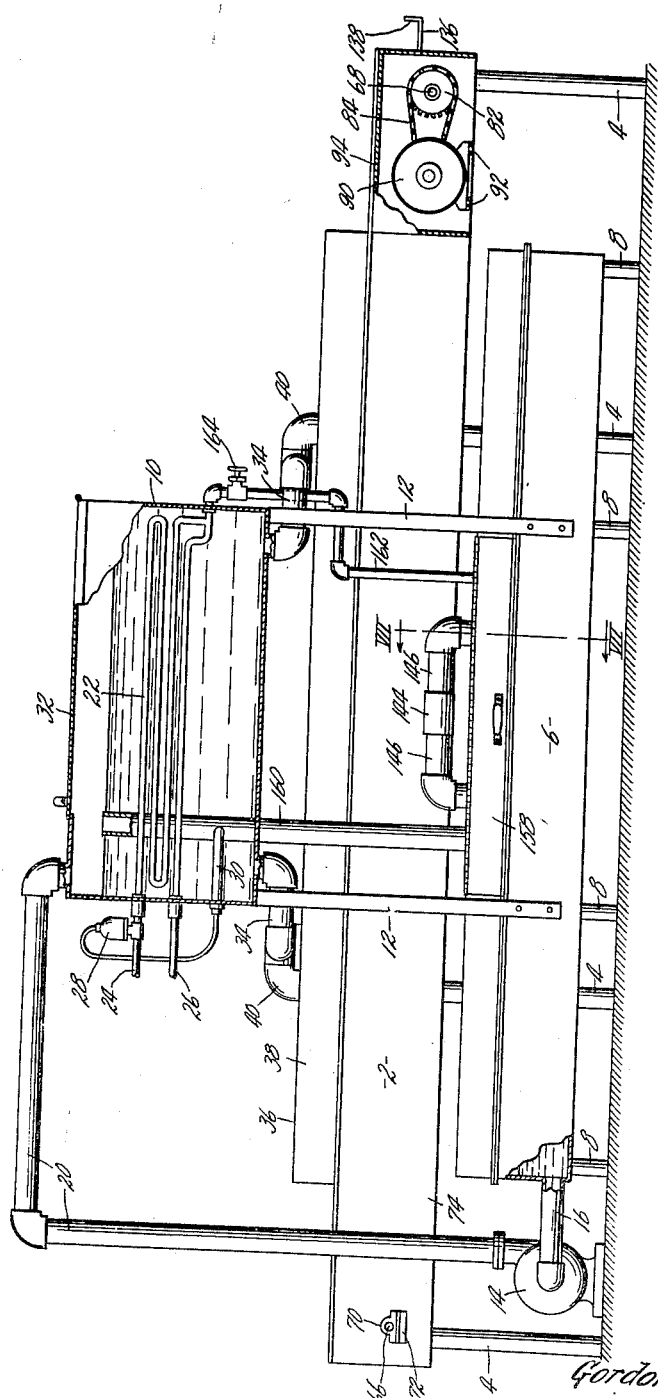
Figure 1 is a side elevation of an egg preserving apparatus embodying the present invention, with parts broken away.
Figure 8:
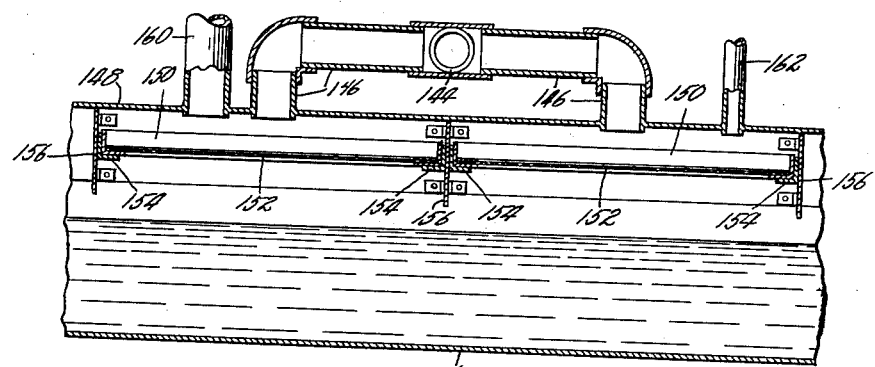
Fig. 8 is a fragmentary section taken on line VIII—VIII of Fig. 7.
Figure 7:
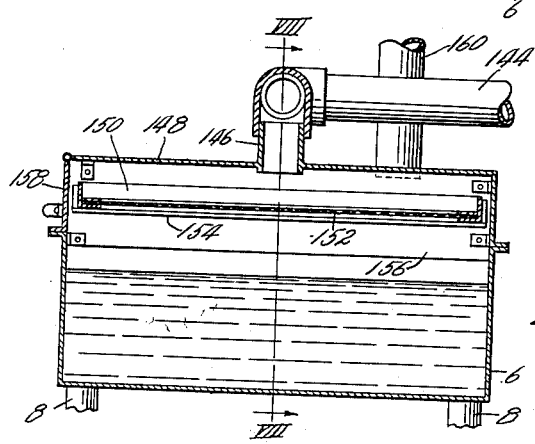
Fig. 7 is an enlarged fragmentary section taken on line VII—VII of Fig. 1.

Like reference numerals apply to similar parts throughout the several views, and the numeral 2 applies to an elongated rectangular egg treating compartment or tank supported above the floor by legs 4. An oil storage tank 6 of elongated rectangular shape is supported adjacent and parallel to tank 2 by floor-engaging legs 8, tank 6 being disposed lower than tank 2. An oil heating tank 10 is supported above tank 6, and at a higher level than tank 2, by means of standards 12 fixed at their lower ends to tank 6.

A liquid suitable for the preserving process above described, usually a light, odorless mineral oil, is carried in tank 6, and flows therefrom to pump 14 through a pipe 16 which interconnects said pump with the lower portion of said tank. Pump 14 is driven by a suitable motor 18, and forces oil upwardly through pipe 20, said pipe being interconnected at its opposite end with oil heating tank 10. Oil thus delivered to tank 10 is heated by any suitable means shown in Fig. 1. Said heat transfer unit is provided with a steam supply pipe 24 and a return pipe 26, said steam supply pipe being provided with a thermostatic valve 28 of standard design controlled by a suitable thermostat 30 immersed in the oil in tank 10. By regulating the thermostat, the oil in the tank may be brought to and maintained at any desired temperature. It is understood that any suitable type of automatically regulated heating equipment may be used for this purpose. Tank 10 is provided with a hinged cover 32. Oil flows by gravity from tank 10 to egg treating tank 2 through pipes 34 as hereinafter described.

Tank 2 is open at the top at each end, and has a cover 36 over the mid-portion thereof, said cover being spaced above the top of tank 2 by side walls 38. Pipes 34 extend horizontally above cover 36 to the longitudinal midline of tank 2, and are each divided to form branches 40, each of said branches extending downwardly through cover 36 and being interconnected at its lower end with the central portion of a pipe 42 extending transversely across tank 2 just below cover 36. Each of pipes 42 is capped at its ends and provided along its lower side with a series of longitudinally spaced holes 44 through which oil may drain by gravity.

As shown in Figs. 2 and 3, there are a series of rigidly mounted crosspieces 46 extending transversely across the upper portion of tank 2 within the limits of cover 36, and a series of angle iron tracks 48 rigidly fixed to said crosspieces and extending longitudinally relative to tank 2 and substantially coextensive with cover 36. Between each adjacent pair of tracks are carried a plurality of oil distributing trays 50. Each of said trays is equipped along its lateral edges with a runner 52 adapted to engage slidably the adjacent tracks, whereby said trays may be slidably removed for cleaning. Each tray is formed to present a series of troughs 54 arranged longitudinally relative to tank 2 and each slightly wider than the diameter of an egg. In the drawing, each tray 50 is illustrated as having a width of six troughs, this being a convenient number for reasons hereinafter set forth. It will be noted that pipes 42 are so distributed along the length of tank 2 that one pipe extends across each of trays 50, and that holes 44 in said pipes are so spaced that a stream of oil flows therefrom into each of troughs 54 of said trays. The floor of each trough is perforated so that oil may flow therethrough by gravity to pass over eggs 56 carried therebeneath by conveyor belt 58. Each perforation 60 of troughs 54 is formed at the bottom of a downward indentation 62 formed in the trough floor, as shown in Figs. 4 to 6. Holes 44 in pipes 42 are so proportioned as to supply oil to each trough 54 at a slightly greater rate than it will flow through perforations 60. The trough is thus maintained full at all times, and an equal pressure will be exerted at each perforation. Any excess oil will flow over the end walls 64 of each tray 50 and drain into tank 2.

Conveyor belt 58 is carried on a pair of shafts 66 and 68 extending transversely through tank 2 respectively adjacent opposite ends thereof, each of said shafts being carried for rotation adjacent its ends in bearings 70 mounted on brackets 72 fixed to the outer surface of side walls 74 of said tank. Each of said shafts carries a sprocket wheel 76 adjacent the inner surface of each of side walls 74, and an endless chain 78 is disposed about said sprocket wheels along each side of tank 2, extending substantially the entire length thereof. Both the upper and lower reaches of each of said chains are supported between sprockets 76 by tracks 80 fixed to side walls 74. Shaft 68 extends outwardly from tank 2, and a sprocket 82 is rigidly fixed to the extended portion thereof as shown in Figs. 1 and 2. Said sprocket is operatively connected by means of chain 84 with a sprocket 86 mounted on the output shaft of a gear reduction unit 88, said gear reduction unit in turn being driven by a suitable motor 90. Motor 90 and reduction unit 88 are carried on supports 92 fixed to the outer surface of tank side wall 74, and are preferably covered by a suitable housing 94.

As best shown in Figs. 3 to 6, a series of support channels 96 extend between chains 78 transversely to tank 2, said channels being equally spaced along said chains and fixed at their ends to specially formed links 98 of said chains by bolts 100, as shown in Fig. 6. A series of longitudinally spaced egg carrier units 100 are fixed to each of channels 96. Each of said carrier units, as best shown in Figs. 4 to 6, includes an elongated, hollow rectangular member 102 fixed adjacent its ends to channel 96 by bolts 104. Said bolts extend upwardly from member 102, and a sleeve 106 is carried on said bolt, said sleeve bearing at its upper end against the head of bolt 104 and at its lower end against the bottom wall 108 of member 102. An aperture 110 is provided in the top wall 112 of member 102 for bolt 104 and sleeve 106, as shown in Fig. 6. Top wall 112 is provided with a series of windows 114 spaced longitudinally along the length of member 102, and each of said windows is covered by a wire screen 116.

A carrier plate 118 is disposed above and parallel to each member 102, and is provided adjacent each of its ends with a rigidly attached sleeve 120 adapted to be carried slidably on sleeves 106. Said carrier plate is normally held in spaced relation above member 102 by springs 122 disposed about sleeves 106, said springs bearing at their upper ends against carrier plate 118 and at their lower ends against bottom wall 108 of member 102. Each carrier plate is provided with a series of circular holes 124 spaced longitudinally therealong, each of said holes being spaced immediately above one of screen windows 114 of member 102. Along the edges of each hole 124, carrier plate 118 is formed to present a plurality of upwardly and inwardly projecting pointed tabs 126 adapted to support an egg 56 immediately above and in centered relation to the hole. Springs 122 are of sufficient strength to maintain carrier plate 118 in its elevated position even when said carrier plate is loaded with eggs, but are sufficiently yielding to act as a cushion when placing the eggs on the carrier plates, thus preventing breakage of eggs. As conveyor belt 58 moves, each egg 56 will be moved longitudinally beneath one of troughs 54 of oil trays 50, and heated oil flowing through perforations 60 of said trays will flow over the egg, as shown in Figs. 4 and 6. The pattern of said perforations is such that each egg is subjected at all times to at least three streams of oil, as shown in Fig. 4, thus insuring rapid and even heating of the egg. And since each egg is supported only on the points of tabs 126, the oil will flow over the entire surface of the egg. The speed of conveyor belt 58 may be regulated so that each egg requires a predetermined time to travel the entire length of oil trays 50. It is contemplated that this time shall be approximately fifteen minutes.

Eggs are placed on conveyor belt 58 at the left end of the machine as viewed in Fig. 2, and removed therefrom at the right end. The eggs may be placed on and removed from the belt by means of any suitable egg handling tool, said tools being commercially available. Usually said tools are adapted to handle thirty-six eggs at a time, this being the number of eggs carried on one layer of a standard egg crate. Thus each of egg carrier units 100 is shown adapted to carry six eggs, so that by removing the eggs from 6 carrier units at a time, an egg crate may conveniently be filled. Of course, it is possible to place and remove the eggs in groups of any number desired. As the eggs emerge from under the right end of carrier 36, the excess oil drains therefrom into tank 2. However, a droplet of oil will collect at the lowermost point of each egg, and this droplet must be removed to prevent wastage of oil and staining of the egg crates and cartons. This function is accomplished in the following manner.

It will be noted in Figs. 5 and 6 that each egg extends below its supporting carrier plate 118, and that springs 122 are sufficiently strong to maintain the carrier plate in its elevated position with eggs positioned thereon. When the egg handling tool above described is positioned over the conveyor belt to remove eggs therefrom, a slight downward pressure is exerted thereon. Carrier plates 118 will thereby be forced downwardly against springs 122, and the lowermost points of the eggs will be brought into contact with screens 116 of windows 114 in member 102, thereby removing the droplets of oil from the eggs. As soon as the eggs emerge from under the streams of hot oil, they will begin to cool, and the partial vacuum resulting within the eggs will draw oil into and through the pores of the egg shells, thereby completing the preserving process.

Figure 9:
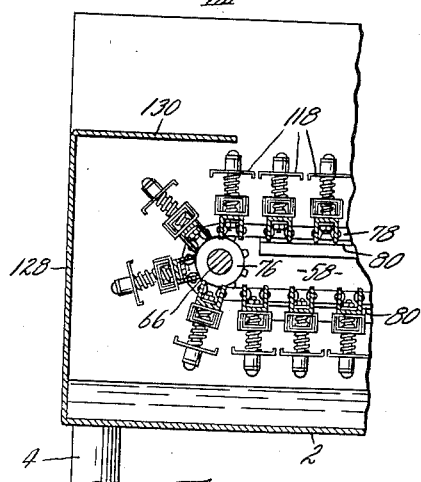
Fig. 9 is an enlarged fragmentary view taken on line IX—IX of Fig. 2.
Figure 10:
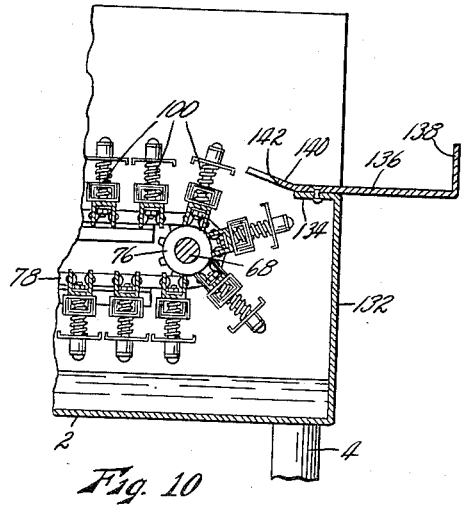
Fig. 10 is an enlarged fragmentary section taken on line X—X of Fig. 2.

The left end wall 128 of tank 2 is bent inwardly to form a horizontal shelf 130 projecting above the end portion of conveyor belt 58 as shown in Fig. 9, thus preventing eggs from falling between wall 128 and the conveyor belt. The right end wall 132 of tank 2 is provided at its upper edge with a flange 134 disposed slightly below the upper surface of belt 58. To said flange is rigidly fixed a horizontal shelf 136 extending completely across the tank. The outer edge portion of said shelf is bent upwardly to form a vertical wall 138 and the inner edge portion 140 of said shelf is inclined upwardly and extends to a point adjacent the orbit of egg carrier plates 118 as they pass about shaft 68. Said inclined shelf portion is notched at 142 to permit the passage of the upper end portions of bolts 104. If by accident eggs are not removed from belt 58 before said belt passes about shaft 68, the eggs will roll from the belt on to shelf 136, and will thus be prevented from falling into tank 2.

Oil draining from the eggs on conveyor belt 58 is collected in the bottom of tank 2, and flows therefrom by gravity through a drain pipe 144 which extends horizontally from tank 2 to a point over the longitudinal midline of tank 6. There said pipe is divided into branches 146, said branches each extending downwardly through the top 148 of tank 6, and being adapted to discharge oil into said tank. Disposed within the upper portion of tank 6, and directly beneath each of branches 146, is a shallow tray 150 having a screen bottom 152. Each of said trays is carried slidably on tracks 154 mounted on vertical plates 156 fixed to the walls of tank 6. Said trays may be removed from tank 6 after opening a hinged door 158 provided in the side wall of the tank.

The function of screen trays 150 is to strain the oil entering tank 6 and to separate moisture therefrom. Eggs removed from cold storage for treatment will collect moisture on the surface thereof by condensation, and this water will be washed from the eggs by the streams of oil. The water thus entrained in the oil impairs the efficiency of the preserving treatment when the oil is recirculated. It has been found that by passing the oil through a fine screen, the water will not pass through the screen, but will be trapped in tray 150. About a 60 mesh copper screen has been found efficient for this purpose. The trays are removed periodically as described to dispose of the water trapped therein. The screens 152 are of sufficient area to pass oil at a rate equal to the delivery rate of pump 14, and tank 6 is of sufficient capacity to contain all of the oil in the system, since all of the oil will flow by gravity to said tank whenever motor 18 is turned off. Oil from tank 6 passes through pipe 16 to pump 14 and is recirculated to tank 2 for further use.

An overflow pipe 160 is interconnected at its lower end with tank 6 above one of screen trays 150, and extends upwardly through the bottom of tank 10 to a point adjacent the top of said tank. Said pipe is adapted to receive the overflow from tank 10 in case oil is delivered to said tank by pump 14 at a greater rate than oil flows out of tank 10 through pipes 34, and to return said overflow to tank 6. A pipe 162 is interconnected at its upper end with a low portion of steam heat transfer unit 22 in tank 10, extends outwardly from said tank, and is interconnected at its lower end with tank 6 immediately above one of screen trays 150. Said pipe is equipped with a valve 164 which may be opened periodically to permit the condensate to be flown through the pipe and into screen tray 150, from which it may be removed together with the water removed from the oil draining from tank 2.

Although a specific embodiment of my invention has been disclosed, it is readily apparent that many minor changes in design and operation could be made without departing from the spirit of the invention.

What I claim is:

1. In an egg preserving apparatus of the class described wherein eggs are carried through streams of heated oil on a traveling conveyor, a conveyor including screen members attached thereto, carrier members carried by said conveyor for movement to and from said screen members and adapted normally to support eggs in spaced relation above said screen members, and yieldable means urging said carrier members away from said screen members, whereby when said carrier members are urged toward said screen members against said yieldable means after the eggs have passed through the streams of oil, the lowermost points of said eggs will contact said screen members.

2. In an egg preserving apparatus of the class described wherein eggs are carried through streams of heated oil on a traveling conveyor belt, a conveyor belt comprising endless side chains, rigid transverse supports carried by said chains, members having screened windows formed therein carried on each of said transverse supports, an egg carrier plate carried by said supports in outwardly spaced relation from each of said screened window members and adapted to be moved to and from said windows, said carrier plate having a hole formed therethrough in registering relation with each of said windows and being adapted to support an egg in centered relation to each of said holes with a portion of said egg extending through said hole, and resilient means yieldably urging said egg carrier plates away from said screened window members.

3. In an egg preserving apparatus of the class described wherein eggs are carried through streams of heated oil on a traveling conveyor belt, a conveyor belt comprising endless side chains, rigid transverse supports carried by said chains, members having screened windows formed therein carried on each of said transverse supports, an egg carrier plate carried by said supports in outwardly spaced relation from each of said screened window members and adapted to be moved to and from said windows, said carrier plate having a hole formed therethrough in registering relation with each of said windows and being formed adjacent each of said holes to present a plurality of pointed tabs adapted to support an egg by point contacts in centered relation in said hole, with a portion of said egg extending through said hole, and resilient means yieldably urging said egg carrier plates away from said screened window members.

4. In apparatus for preserving eggs, a conveyor comprising a pair of spaced, endless belts; a series of cross elements joining the belts; a number of upwardly-extending guides on each element respectively; a carrier plate egg support for each element respectively and mounted on the guides for reciprocable movement toward and away from the elements, said plates each having egg-receiving holes therein; spring means on the guides for yieldably holding the plates biased away from the elements; and a member on each element respectively below the plates having a screened aperture therein in alignment with each hole respectively for engagement by the eggs upon downward movement of the plates toward the elements against the action of the springs.

5. In egg preserving apparatus, an elongated continuous, longitudinally-movable conveyor including a pair of spaced, endless, flexible elements, a plurality of horizontal carrier plates interconnecting the elements, each plate having means for supporting a plurality of eggs, aligned in rows extending both longitudinally and transversely of the conveyor; an elongated, open top, horizontal trough above each longitudinal row of eggs respectively, the longitudinal axes of the troughs being parallel with the path of travel of the conveyor; and means for supplying the troughs with an egg-preserving liquid, said troughs being provided with perforations in the bottoms thereof for directing the liquid to the eggs as the same are advanced by the conveyor.

6. In egg preserving apparatus, an elongated, continuous, longitudinally-movable conveyor including a pair of spaced, endless, flexible elements, a plurality of horizontal carrier plates interconnecting the elements, each plate having means for supporting a plurality of eggs, aligned in rows extending both longitudinally and transversely of the conveyor; a plurality of side-by-side trays; a number of tracks for slidably receiving the trays, each tray including a series of elongated, open top, horizontal troughs, there being a trough above each longitudinal row of eggs respectively, the longitudinal axes of the troughs being parallel with the path of travel of the conveyor; and means for supplying the troughs with an egg-preserving liquid, said troughs being provided with perforations in the bottoms thereof for directing the liquid to the eggs as the same are advanced by the conveyor.

7. In egg preserving apparatus, an elongated, continuous, longitudinally-movable conveyor including a pair of spaced, endless, flexible elements, a plurality of horizontal carrier plates interconnecting the elements, each plate having means for supporting a plurality of eggs, aligned in rows extending both longitudinally and transversely of the conveyor; an elongated, open top, horizontal trough above each longitudinal row of eggs respectively, the longitudinal axes of the troughs being parallel with the path of travel of the conveyor; a number of elongated horizontal pipes above the troughs and having their longitudinal axes perpendicular to a vertical plane through said path of travel of the conveyor; and means for supplying the pipes with an egg-preserving liquid, said pipes each having a number of holes for directing the liquid to the troughs, said troughs being provided with perforations in the bottoms thereof for directing the liquid to the eggs as the same are advanced by the conveyor.

8. In egg preserving apparatus, an elongated, continuous, longitudinally-movable conveyor including a pair of spaced, endless, flexible elements, a plurality of horizontal carrier plates interconnecting the elements, each plate having means for supporting a plurality of eggs, aligned in rows extending both longitudinally and transversely of the conveyor; and structure for resiliently attaching the plates to the elements at each end respectively of the plates, said structures each including a bolt perpendicular to the path of travel of the conveyor, mounting means securing the bolt to a corresponding element, and a spring coiled around the bolt, said springs being between the plates and said mounting means, the plates being reciprocably mounted on the bolts.

9. In egg preserving apparatus, an elongated, continuous, longitudinally-movable conveyor including a pair of spaced, endless chains and a plurality of horizontal channel elements interconnecting the plates; a bolt mounted on each end respectively of each channel element perpendicular to the path of travel of the conveyor; a tubular member on each channel respectively, interconnecting the bolts thereof and provided with a plurality of screened openings; a spring coiled around each bolt respectively; and a carrier plate spaced from each tubular member respectively, reciprocably carried by the bolts and provided with an egg-receiving hole for each screened opening respectively and aligned therewith, the springs being between the channel elements and the carrier plates.

GORDON W. JOHNSON.

References Cited in the file of this patent

UNITED STATES PATENTS

| Number | Name | Date |
| --- | --- | --- |
| 241,492 | Howell | May 17, 1881 |
| 1,202,146 | Balcar | Oct. 24, 1916 |
| 1,234,131 | Cleveland | July 24, 1917 |
| 1,542,347 | McCullough | June 16, 1925 |
| 1,681,301 | Maggi | Aug. 21, 1928 |
| 1,776,784 | Cramer | Sept. 30, 1930 |
| 2,014,646 | Christian | Sept. 17, 1935 |
| 2,184,063 | Meyer et al. | Dec. 19, 1939 |
| 2,203,141 | Gruetter | June 4, 1940 |
| 2,221,343 | Mulvany | Nov. 12, 1940 |
| 2,250,518 | Ashlock | July 29, 1941 |